United States Patent [19]

Uchida

[11] 4,359,191

[45] Nov. 16, 1982

[54] DOUBLE-INJECTION TYPE FUEL INJECTION VALVE

[75] Inventor: Kazuo Uchida, Higashi-Matsuyama, Japan

[73] Assignee: Diesel Kiki Co., Ltd., Matsuyama, Japan

[21] Appl. No.: 237,941

[22] Filed: Feb. 25, 1981

[30] Foreign Application Priority Data

Mar. 1, 1980 [JP] Japan .............................. 55-26345[U]
May 23, 1980 [JP] Japan .............................. 55-71940[U]
Jun. 27, 1980 [JP] Japan .............................. 55-91018[U]

[51] Int. Cl.³ ............................................. F02M 45/08
[52] U.S. Cl. ................................ 239/533.5; 239/533.9
[58] Field of Search ......................... 239/533.2–533.11, 239/584

[56] References Cited

U.S. PATENT DOCUMENTS 2,921,746 1/1960 Burman ............................ 239/533.2

FOREIGN PATENT DOCUMENTS 1172861 2/1959 France .............................. 239/533.9
54-3224 2/1979 Japan.

Primary Examiner—Andres Kashnikow
Attorney, Agent, or Firm—Frishauf, Holtz, Goodman and Woodward

[57] ABSTRACT

A fuel injection valve including a first nozzle spring and a second nozzle spring provided in its nozzle holder, wherein fuel injection is carried out in such a double-step manner that lifting of the nozzle needle through the initial injection stroke causes contraction of the first nozzle spring and subsequent lifting of the nozzle needle through the main injection stroke causes contraction of the second nozzle spring as well as the first nozzle spring. The first nozzle spring is supported by a first movable spring seat coupled to the nozzle needle, and the second nozzle spring by a second movable spring seat which engages a lift adjusting threaded member rotatably threadedly mounted in the nozzle holder for axial displacement relative to the nozzle holder, respectively. Axial rotative displacement of the lift adjusting threaded member causes corresponding axial displacement of the second movable spring seat through the second nozzle spring, whereby the gap between the first nozzle spring and the second nozzle spring can be adjusted within a range of between zero and a predetermined value determining the initial injection lift of the nozzle needle. Setting of the main injection valve opening pressure of the nozzle needle can be effected with facility by rotating the lift adjusting threaded member to make the above gap zero and then adjusting the setting load of the second nozzle spring so as to obtain a value of the sum of the setting loads of the first and second nozzle springs corresponding to a desired valve opening pressure value.

12 Claims, 10 Drawing Figures

DOUBLE-INJECTION TYPE FUEL INJECTION VALVE

BACKGROUND OF THE INVENTION

The present invention relates to a fuel injection valve for use in a direct-injection type internal combustion engine.

In a conventional diesel engine, there is a problem that while the fuel injection rate, i.e., injection quantity per unit time should be set at a suitably high value for improvement of the output characteristic of the engine as well as prevention of the emission of nitrogen oxides and other detrimental products, an increased fuel injection rate can lead to a correspondingly shortened injection period, which can cause a reduction in the combustion duration, resulting in a combustion noise, and can also cause an increase in maximum pressure within the engine cylinders.

On the other hand, in a conventional fuel injection valve used in such conventional diesel engine, the nozzle needle is urged by a single spring, so that the valve operation is monotonously affected by pressure changes within the injection pipe connected to the valve, that is, a specific amount of increase in the pressure within the injection pipe causes the same amount of increase in the lift of the nozzle needle in a lower injection quantity range as in a higher injection quantity range. Therefore, in a lower injection quantity range, the nozzle needle can lift through an excessive stroke to provide an excessive injection quantity due to an increase in the pressure within the injection pipe, and the resulting pressure drop in the injection pipe causes an undesirably small injection quantity during the next injection period, followed by an excessive injection quantity during the subsequent injection period. In this manner, the fuel injection valve suffers an unstable or irregular injection. Although a conventional fuel injection valve using a pintle nozzle can overcome such phenomenon of unstable or irregular injection due to the shape of its nozzle needle which produces a throttling effect, one using a hole nozzle is unable to avoid the above-mentioned phenomenon.

To solve this problem, a fuel injection valve has been proposed by the assignee of the present application in Japanese Utility Model Publication No. 54-3224, which includes a second nozzle spring arranged within its nozzle holder in addition to a conventionally employed first nozzle spring. In this proposed fuel injection valve, fuel injection takes place in two steps, i.e., an initial injection and a main injection, in such a manner that during the initial injection the first nozzle spring operates wherein the nozzle needle lifts through a limited stroke, and the main injection subsequently takes place with the valve opening pressure determined by the combined force of the first and second nozzle springs. This double-step injection reduces the injection rate throughout the whole injection period, thus substantially overcoming all the aforementioned drawbacks of combustion noise, emission of nitrogen oxides and irregular injection.

According to the proposed fuel injection valve, the valve opening pressure available at the initial injection is determined by the setting load of the first nozzle spring which takes part in the initial injection, and one available at the main injection by the sum of the setting loads of the first and second nozzle springs both taking part in the main injection, respectively. However, this fuel injection valve has the structural disadvantage that in adjusting the setting load of the second nozzle spring, it is impossible to bring the two nozzle springs into positions both seated on the injection hole portion through the nozzle needle, in which positions the two springs have their setting loads combined together, resulting in difficulties in achieving accurate setting of the setting load of the second nozzle spring so as to obtain a desired main injection valve opening pressure.

Further, the above conventional fuel injection valve is constructed such that adjustment of the lift of the nozzle needle for the initial injection has to be made by selecting the thickness of a shim interposed between a common spring seat for the two nozzle springs and a portion of the nozzle holder associated therewith, which makes it impossible to adjust the setting loads of the two nozzle springs independently of each other.

SUMMARY OF THE INVENTION

It is an object of the invention to provide a fuel injection valve which permits obtaining the sum of the setting loads of a first nozzle spring mainly taking part in the initial injection, and a second nozzle spring taking part in the main injection, by bringing the two springs into their seated positions at the same time, thereby enabling accurate setting of the setting load of the second nozzle spring so as to obtain a desired valve opening pressure for main injection.

It is another object of the invention to provide a fuel injection valve which permits adjusting the setting loads of the first nozzle spring and second nozzle spring in a manner independent of each other, thereby enabling accurate setting of the valve opening pressures for initial injection and main injection.

It is a further object of the invention to provide a fuel injection valve which permits adjusting the lift of the nozzle needle for initial injection from outside, with ease and accuracy.

According to the invention, there is provided a fuel injection valve comprising: an injection nozzle having a nozzle hole portion and a nozzle needle arranged to be seated on said nozzle hole portion: a nozzle holder supporting said injection nozzle: a first spring arranged within said nozzle holder; a first movable spring seat coupled to said nozzle needle and supporting said first spring; means for adjusting the setting load of said first spring; a lift adjusting threaded member threadedly engaging said nozzle holder and rotatable relative thereto for displacement axially thereof, said threaded member arranged to be operated for rotation from outside; a second spring supportedly engaging said lift adjusting threaded member; a second movable spring seat engaging said lift adjusting threaded member and supporting said second spring, said second movable spring seat having one end disposed in a facing relation to said first movable spring seat and adapted to have said one end spaced from the latter by a predetermined gap when said nozzle needle is in a seated position; said second spring and said second movable spring seat being so disposed that said first and second springs have a combined force acting upon said nozzle needle when said nozzle needle is lifted beyond said predetermined gap; axial displacement of said lift adjusting threaded member, which is caused by rotation thereof, causing corresponding axial displacement of said second movable spring seat through said second spring, thereby permitting adjustment of the position of said second movable spring seat relative to said first movable spring seat so as to set the gap between said first movable spring seat and said second movable spring seat at a value within a range of between zero and a value equal to said predetermined gap when said nozzle needle is in a seated position; and means arranged to be operated from outside for adjusting the setting load of said second spring; whereby lifting of said nozzle needle from a seated position causes said first movable spring seat to be lifted against the force of said first spring through a lift of said nozzle needle determined by said predetermined gap to effect an initial injection, and, thereafter, causes said first movable spring seat to urge said second movable spring seat against the combined force of said first and second springs to lift said second movable spring seat to effect a main injection.

The above and other objects, features and advantages of the invention will be more apparent upon reading the ensuing detailed description taken in connection with the accompanying drawings.

DETAILED DESCRIPTION

Figure 1:
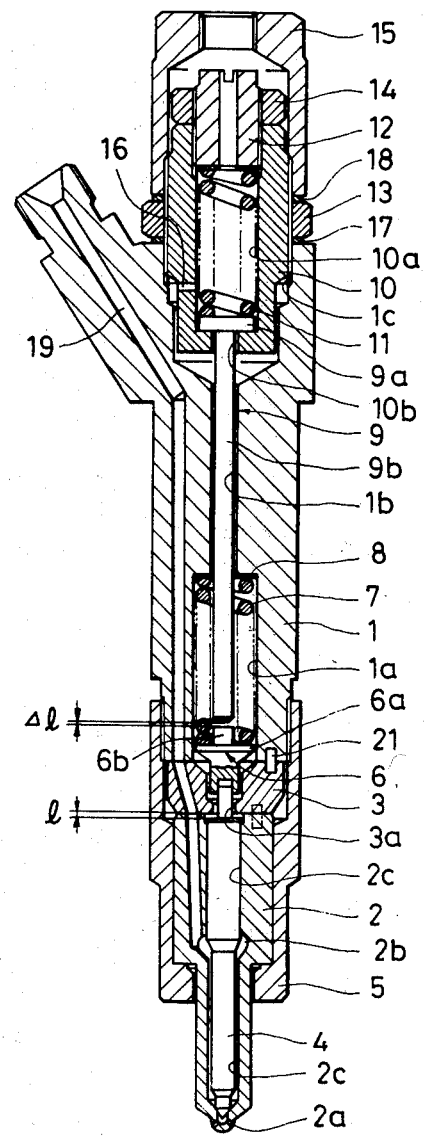
FIG. 1 is a longitudinal sectional view of a fuel injection valve according to a first embodiment of the invention.

Referring now to the drawings, wherein like reference characters designate like or corresponding parts throughout all the views, there is illustrated several embodiments of the invention.

FIG. 1 illustrates a first embodiment of the invention. Reference numeral 1 designates a nozzle holder at an end of which a nozzle body 2 is arranged via a fuel supply passage guiding piece 3, which has nozzle holes 2a formed in its tip and an axial hole 2c communicating with the nozzle holes 2a. A nozzle needle 4 is slidably inserted through the axial hole 2c of the nozzle body 2 and an axial hole 3a formed in the guide piece 3. The nozzle body 2 and the guide piece 3 are rigidly mounted on the nozzle holder 1 by means of a nozzle nut 5 threadedly mounted on the nozzle holder 1.

The nozzle needle 4 is coupled at its upper end to the lower end of a movable spring seat 6 which is slidably placed within a spring hole 1a formed in a lower end portion of the nozzle holder 1. The movable spring seat 6 has an enlarged intermediate portion serving as a spring seating portion 6a which supports a first nozzle spring 7 placed within the spring hole 1a in a manner interposed between the portion 6a and the bottom of the spring hole 1a with a setting load adjusting shim 8 intervening between the spring 7 and the bottom of the hole 1a. The nozzle spring 7 urges the nozzle needle 4 against the nozzle holes 2a through the movable spring seat 6. The nozzle holder 1 has a further axial hole 1b formed therein in communication with the spring hole 1a and opening in an end face of the holder 1 remote from the nozzle needle 4, and through which hole extends the push rod 9b of another movable spring seat 9. The nozzle holder 1 has another axial hole 1c which has a threaded inner peripheral wall and opens in the upper end of the holder 1, and in which is threadedly fitted a lift adjusting threaded member 10 for rotation relative to the nozzle holder 1, which has an internal space 10a formed therein which has a lower end wall formed with a through hole 10b through which extends the abovementioned push rod 9b of the movable spring seat 9. The movable spring seat 9 has an enlarged spring seating portion 9a formed at its upper end and disposed within the internal space 10a in a manner engaged by the inner end surface of the lower end wall of the internal space 10a.

The above lift adjusting threaded member 10 serves to adjust through its rotation the lift gap $\Delta l$ corresponding to the initial injection lift of the nozzle needle 4 which will be referred to hereinafter, and is retained in its adjusted position by means of a nut 13 after adjustment of the above lift gap.

A second nozzle spring 11 is placed within the internal space 10a of the threaded member 10 with its lower end disposed in urging contact with the spring seating portion 9a of the movable spring seat 9 and its upper end in urging contact with the lower end face of a load adjusting threaded member 12 which is threadedly fitted in the upper portion of the internal space 10a for rotation relative to the member 10. This load adjusting threaded member 12 is vertically movable through its rotation to adjust the setting load of the second nozzle spring 11, and after adjustment is retained in its adjusted position by means of a nut 14. The threaded member 10 is covered with a cap nut 15 after the adjusting operation is finished. The threaded member 10 has its lateral wall formed with a through hole 16 through which leakage fuel escapes toward the upper portion of the fuel injection valve.

In FIG. 1, reference numerals 17 and 18 designate liquid-tight packings, reference numeral 19 a fuel passage for guiding fuel supplied from a fuel injection pump, not shown, into a pressure chamber 2b formed within the nozzle body 2 through an injection pipe, not shown, nozzle holder 1, guide piece 3 and nozzle body 2, and 21 a dowel pin retaining the nozzle holder 1 and the guide piece 3 in a circumferentially fixed relative position, respectively.

The movable spring seat 6 has an upwardly projected top 6b whose top surface is spaced from the opposed lower end face of the push rod 9b of the movable spring seat 9 by the above-mentioned lift gap $\Delta l$, when the nozzle needle 4 is seated on the injection holes 2a.

The fuel injection valve constructed above operates as follows: The nozzle needle 4 starts to be lifted when the pressure within the injection pipe, i.e., that within the pressure chamber 2b exceeds the initial injection valve opening pressure determined by the force of the first nozzle spring 7, due to supply of fuel into the pressure chamber 2b through the fuel passage 19. When the nozzle needle 4 has been lifted through the initial injection lift $\Delta l$, the top 6b of the movable spring seat 6 strikes the lower end of the push rod 9b of the movable spring seat 9. On this occasion, the movable spring seat 9 does not start to be lifted so long as the pressure within the injection pipe is under the sum of the setting load of the second nozzle spring 11 and the force of the first nozzle spring 7 which is available at the time the nozzle needle 4 has finished lifting through the initial injection lift $\Delta l$. Upon the pressure within the injection pipe exceeding the sum of the loads of the two nozzle springs, the nozzle needle 4 is further lifted to urge the movable spring seat 9 through the movable spring seat 6 until it finishes lifting through the maximum lift 1 which is determined by the gap between the upper end face of the nozzle needle 4 and the lower end face of the guide piece 3 which is available at the time the nozzle needle 4 is in its seated position.

By virtue of the above-mentioned lift characteristics of the nozzle needle, during the initial injection which lasts until the lift $\Delta l$ is executed, the clearance between the nozzle needle and the associated seating portion of the nozzle body is small, resulting in a low fuel injection rate, while during the main injection which takes place after execution of the lift $\Delta l$, the above clearance is sufficiently large, resulting in a high fuel injection rate.

In the above-constructed fuel injection valve according to the invention, adjustment of the first and second nozzle springs 7, 11 is carried out in the following manner. First, the setting load of the first nozzle spring 7 is adjusted by selecting the thickness of the adjusting shim 8 so as to obtain a desired valve opening pressure for initial injection. Further, to adjust the setting load of the second nozzle spring 11, the lift adjusting threaded member 10 is rotated until the two movable spring seats 6, 9 come into contact with each other so that the initial injection lift gap $\Delta l$, i.e., the gap between the upper end face of the top 6b of the movable spring seat 6 and the lower end face of the push rod 9b of the movable spring seat 9 becomes zero. With the spring seats 6, 9 in this position, the setting load of the second nozzle spring 11 is adjusted so as to obtain a desired valve opening pressure for main injection by rotating the load adjusting threaded member 12. After this adjustment, the threaded member 12 is retained in its adjusted position by means of the lock nut 14. Following the above-mentioned adjustment of the setting loads of the first and second nozzle springs, the lift adjusting threaded member 10 is rotated so as to obtain a desired lift gap $\Delta l$ for initial injection. After this setting of the lift gap $\Delta l$, the lock nut 13 is threadedly fitted onto the lift adjusting threaded member 10 to retain it in its adjusted position.

As stated above, a feature of the invention is that the second movable spring seat 9 is so movable that in adjusting the second nozzle spring 12, the push rod 9b of the spring seat 9 can be in contact with the upper protuberance 6b of the first movable spring seat 6. This makes it possible to obtain the sum of the setting loads of the first and second nozzle springs 7, 11, both in seated positions, by way of the nozzle needle 4, with the result that the setting load of the second nozzle spring 11 can be adjusted with accuracy so as to set the valve opening pressure for main injection at a desired value. In addition, setting of the setting loads of the first and second nozzle springs can be achieved independently of each other by means of the load adjusting shim 8 and the load adjusting threaded member 12 provided exclusively for the respective two springs, which enables accurate adjustment of both the valve opening pressure for initial injection and one for main injection.

Further, in adjusting the setting load of the second nozzle spring 11 for setting the valve opening pressure for main injection, the initial injection lift gap $\Delta l$ between the first and second movable spring seats 6, 9 can be made zero merely by rotating the lift adjusting threaded member 10. Also, adjustment of the lift gap $\Delta l$ per se can be simply made merely by rotating the same member 10, which does not require removal of the second nozzle spring, etc. in each adjusting operation, as distinct from an arrangement in which an adjusting shim is used, greatly facilitating the operation of adjusting the lift gap $\Delta l$. Still further, as is noted from FIG. 1, the threaded member 10 provided for adjusting the initial injection lift gap $\Delta l$ has a rather large diameter, which imparts sufficient structural strength to the fuel injection valve enough to endure reciprocating motions of the second movable spring seat 9.

As noted above, the lift adjusting threaded member 10 which is rotatably threaded in the threaded hole 1c formed in the nozzle holder 1 is retained in its adjusted position by the lock nut 13 after adjustment of the initial injection lift gap $\Delta l$. However, like ordinary threaded parts, there exist small tolerances between the thread formed on the outer peripheral surface of the threaded member 10 and the thread formed on the inner peripheral surfaces of the threaded hole 1c of the nozzle holder 1 and that formed on the inner peripheral surface of the lock nut 13, which may result in play of the threaded member 10 relative to the nozzle holder 1 and the lock nut 13. This play of the member 10 makes it difficult to make accurate adjustment of the initial injection lift gap $\Delta l$ through rotation of the member 10 and also may cause dislocation of the threaded member 10 from its adjusted position in fastening the member 10 by the lock nut 13. While the actual value of the initial injection lift gap $\Delta l$ which is employed in a fuel injection valve of this kind is very small, i.e., of the order of 0.1 mm, the tolerances between the abovementioned threads are of the same order as the lift gap $\Delta l$, resulting in difficulties in achieving accurate adjustment of the lift gap.

Figure 2:
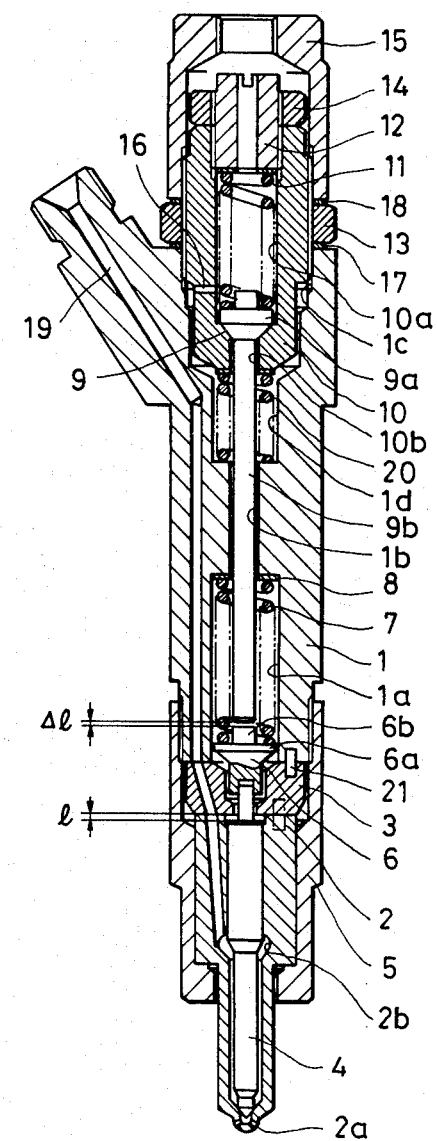
FIG. 2 is a longitudinal sectional view of a fuel injection valve according to a second embodiment of the invention.

FIG. 2 illustrates a second embodiment of the invention. The fuel injection valve according to this embodiment is distinguished from the above described embodiment, as shown in FIG. 1, in that a U-shaped cavity 1d is formed under and in communication with the hole 1c formed in the nozzle holder 1, with a retaining coil spring 20 interposed between the bottom surface of the cavity 1d and the lower end surface of the lift adjusting threaded member 10 in a manner permanently urging the member 10 in the upward direction or direction away from the first movable spring seat 6. The arrangement of the other parts or elements in this embodiment is generally similar to that in the embodiment illustrated in FIG. 1, description of which is, therefore, omitted here.

Figure 3:
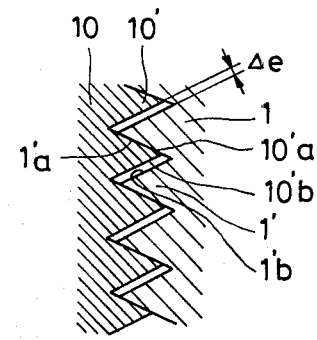
FIG. 3 is an enlarged sectional view showing the threaded engagement of the opposed threaded portions of a lift adjusting threaded member and a nozzle holder both shown in FIG. 2.

According to this FIG. 2 arrangement, the adjustment of the initial injection lift gap $\Delta l$ is made by rotating the lift adjusting threaded member 10 in the same manner as in the FIG. 1 arrangement. During this adjustment, the coil spring 20 located under the threaded member 10 permanently upwardly urges the member 10 so that the member 10 and the nozzle holder 1 are held in a fixed positional relationship as illustrated in FIG. 3, wherein the upwardly facing slanted surfaces 10'a of the thread 10' of the member 10 are kept in contact with the respective associated downwardly facing slanted surfaces 1'a of the thread 1' of the nozzle holder 1, keeping a gap corresponding to the tolerance $\Delta l$ between each downwardly directed slanted surface 10'b of the thread 10' of the member 10 and its associated upwardly directed slanted surface 1'b of the thread 1' of the nozzle holder 1. Therefore, it is possible to always adjust with accuracy the initial injection lift gap $\Delta l$ between the protuberance 6b of the movable spring seat 6 and the push rod 9b of the movable spring seat 9 by rotating the lift adjusting threaded member 10.

Since the threaded member 10 is permanently upwardly urged by spring 20, it will not be dislocated from its adjusted position during the operation of fastening the member 10 by means of lock nut 13 after adjustment of the initial injection lift gap $\Delta l$. That is, during this fastening operation, the lock nut 13 and the lift adjusting threaded member 10 are placed in such a threadedly engaged relationship that the upwardly directed slanted surfaces of the thread of the latter are urged against the respective associated downwardly directed slanted surfaces of the thread of the former, similar to the relationship illustrated in FIG. 3, but such relationship is already obtained by the action of the spring 20 before the above fastening operation and, accordingly, the threaded member 10 is never displaced relative to the lock nut 13 during the fastening operation.

Figure 4:
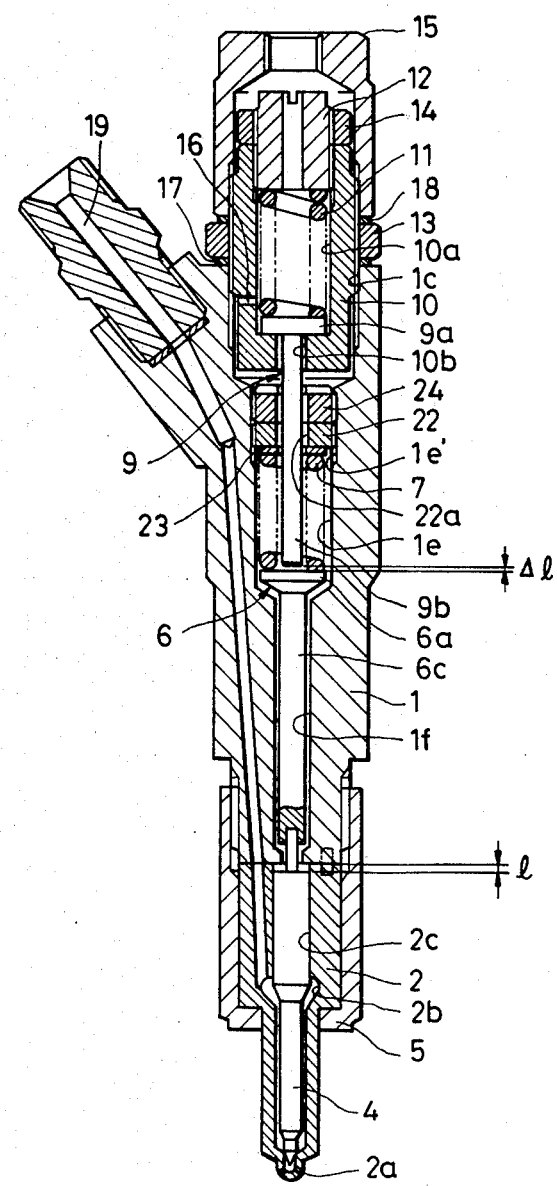
FIG. 4 is a longitudinal sectional view of a fuel injection valve according to a third embodiment of the invention.
Figure 5:
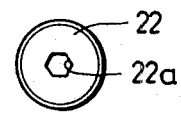
FIG. 5 is a top plan view of a lock nut shown in FIG. 4.
Figure 6:
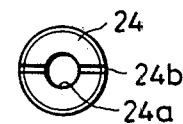
FIG. 6 is a top plan view of a nut shown in FIG. 4.

FIG. 4 illustrates a third embodiment of the invention. According to this embodiment, the nozzle body 2 is arranged in direct contact with the lower end of the nozzle holder 1, and the nozzle holder 1 has formed therein an internal space 1e which is located adjacent the hole 1c opening in the end face of the nozzle holder 1 remote from the nozzle body 2, and a little smaller in diameter than the latter. A further hole 1f is formed in the nozzle holder 1 which communicates the internal space 1e with the nozzle needle sliding hole 2c in the nozzle body 2 and through which is slidably inserted a push rod 6c which downwardly extends integrally from the first movable spring seat 6 and which has its lower end coupled to the upper end of the nozzle needle 4. The first nozzle spring 7 is placed within the internal space 1e with its one end disposed in urging contact with the enlarged spring seating portion 6a of the spring seat 6. The internal space 1e has a threaded upper inner peripheral wall 1e', and a nut 22 for adjusting the setting load of the first nozzle spring 7 is rotatably threadedly fitted in the internal space 1e at the upper inner peripheral wall 1e'. Disposed in urging contact with the lower end face of the nut 22 is the other end of the first nozzle spring 7 with a spring seat member 23, which has a predetermined thickness, intervening between the nut 22 and the spring 7. A lock nut 24 is threadedly fitted in the upper portion 1e' of the hole 1e in contact with the upper end face of the nut 22 to retain it in place. The nut 22 is formed with an axial through bore 22a extending along its axis and in which a screw-driver is to be engaged, the bore 22a having a hexagonal cross-section as illustrated in FIG. 5. On the other hand, the lock nut 24 is formed with an axial through bore 24a having a circular cross section and extending along its axis as well as a radial groove 24b formed in its upper end face and extending through its center, in which groove a screwdriver is to be engaged, as illustrated in FIG. 6. A gap $\Delta l$, determining the initial injection lift of the nozzle needle, is provided between the upper end of the enlarged spring seating portion 6a of the first movable spring seat 6 and the lower end of the push rod of the second movable spring seat 9, and a gap l, determining the total lift of the nozzle needle between the upper end of the nozzle needle 4 and an associated lower end surface of the nozzle holder 1, respectively.

In this embodiment, the other parts or elements, not described above, are substantially identical in arrangement and construction with the corresponding parts or elements of the embodiment illustrated in FIG. 1, description of which is, therefore, omitted here. Also, the operation of the fuel injection valve according to this embodiment is substantially identical with that of the embodiment of FIG. 1, description of which is also omitted here.

In the embodiment of FIG. 4, adjustment of the setting load of the first nozzle spring 7 for obtaining a desired initial injection valve opening pressure is made by rotating the load adjusting nut 22. To make this adjustment, the lift adjusting threaded member 10 is removed together with the second nozzle spring 11 and the second movable spring seat 9 both engaged therein, and then the lock nut 24 removed. Then, a suitable screwdriver is fitted into the hexagonal bore 22a of the nut 22 through the internal space 1e from outside to rotate the nut 22 to adjust the setting load of the spring 7 until a desired initial injection valve opening pressure is obtained. After this adjustment, the lock nut 24 is fitted into the space 1e by means of a suitable screwdriver to retain the nut 22 in its adjusted position.

Thereafter, adjustment of the setting load of the second nozzle spring 11 is carried out. To this end, the lift adjusting threaded member 10 is threadedly fitted into the hole 1c together with the second nozzle spring 11 and the second movable spring seat 9 incorporated therein, and then is rotated until the push rod 9b of the second movable spring seat 9 comes into contact with the enlarged spring seat 6a of the first movable spring 6 to make zero the gap $\Delta l$. In this position, like the embodiment of FIG. 1, the load adjusting threaded member 12 is rotated so as to set the setting load of the second nozzle spring 11 at such a value that a disired main injection valve opening pressure is obtained, followed by retaining the threaded member 12 in its adjusted position by means of the lock nut 14. Thereafter, the lift adjusting threaded member 10 is rotated to be displaced so as to obtain a desired initial injection lift gap $\Delta l$.

As noted above, according to this embodiment, in addition to the features resulting from the arrangement of FIG. 1, the feature whereby the member 22 for adjusting the setting load of the first nozzle spring 7 is threadedly fitted in the hole 1e which is accessible from outside, for rotative displacement therein, enables adjustment of the setting load of the first nozzle spring 7 without removing the spring 7 through dismantling of the nozzle portion, but merely by rotating the nut 22 by means of a screwdriver or the like, thus facilitating the adjustment of the initial injection valve opening pressure.

FIGS. 7 through 10 illustrate further embodiments of the invention which are variations of the above described arrangement of FIG. 4. Referring to the arrangement of FIG. 7, the second movable spring seat 9' has an enlarged spring seating portion 9'a formed integrally with an extension 9'b extending therefrom in the direction away from the nozzle portion of the valve. This extension 9'b extends through a central through bore 10'b formed in the lift adjusting threaded member 10' which has a recess 10'a opening in its lower end face, to have its threaded upper end 9'b' projected upwardly from the member 10'. A nut 25 and a lock nut 14' are threadedly fitted on the projected threaded upper end 9'b' of the extension 9'b. The second nozzle spring 11 is interposed between the bottom face of the recess 10'a of the threaded member 10' and the upper face of the enlarged spring seating portion 9'a of the second movable spring seat 9'.

In this embodiment, the other parts or elements are arranged or constructed similarly to those of the arrangements of FIGS. 4 through 6, description of which is omitted here.

The manner of adjustment of the fuel injection valve according to this embodiment is as follows: After adjustment of the setting load of the first nozzle spring 7 is carried out in a manner similar to that applied to the embodiment of FIG. 4, the lift adjusting threaded member 10' is threadedly fitted into the space 1c and rotated to being the second movable spring seat 9' into contact with the first movable spring seat 6. Then, the nut 25 is rotated to adjust the setting load of the second nozzle spring 11 so as to obtain a desired main injection valve opening pressure, followed by retaining the nut 25 in its adjusted position by means of the lock nut 14'. Then, the lift adjusting threaded member 10' is rotated until a desired initial injection lift gap Δl is obtained.

With this arrangement, during the main injection stroke, the second movable spring set 9' is upwardly urged by the first movable spring seat 6 so that as shown in FIG. 5, the nut 25 and the lock nut 14' are correspondingly upwardly moved to be detached from the upper end face of the lift adjusting threaded member 10'.

Figure 9:
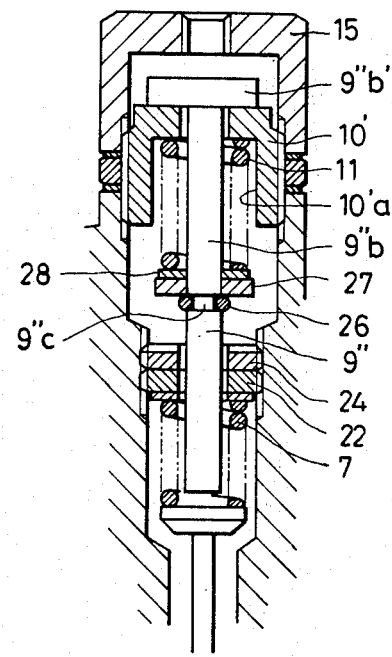
FIG. 9 is a longitudinal sectional view of the essential part of a fuel injection valve according to a fifth embodiment of the invention.

Referring next to the embodiment of FIG. 9, the second movable spring seat 9" has an integral extension 9"b which has its upper end formed integrally with an enlarged portion 9"b' disposed for urging contact with the upper end face of the lift adjusting threaded member 10'. The second movable spring seat 9" is also formed with an annular groove 9"c located at the lower end of the integral extension 9"b in which groove is fitted a snap ring 26. A spring set member 27 is fitted on the extension 9"b in a manner resting on the upper face of the snap ring 26. The second nozzle spring 11 is interposed between the bottom face of the recess 10'a of the lift adjusting threaded member 10' and the spring seat member 27 with a load adjusting shim 28 intervening between the spring 11 and the member 27.

Figure 7:
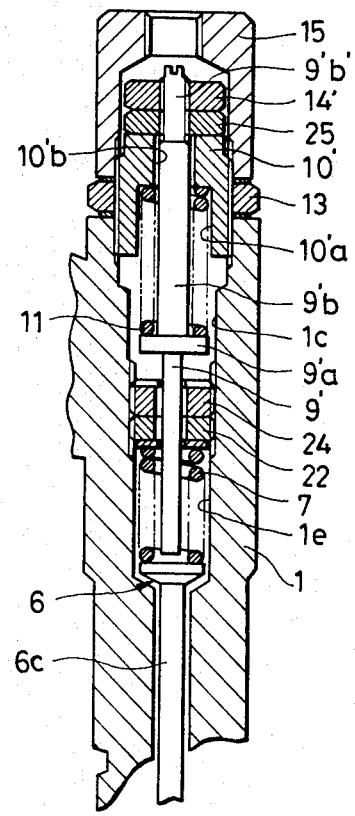
FIG. 7 is a longitudinal sectional view of the essential part of a fuel injection valve according to a fourth embodiment of the invention.
Figure 8:
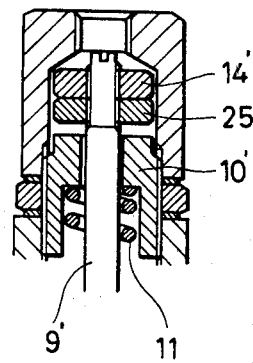
FIG. 8 is a longitudinal sectional fragmentary view of the valve in FIG. 7 which is in a position during main injection.

The manner of adjustment of the arrangement according to this embodiment is substantially identical with that applied to the embodiment of FIG. 7, except that adjustment of the setting load of the second nozzle spring 11 is carried out by varying the thickness of the shim 28.

Figure 10:
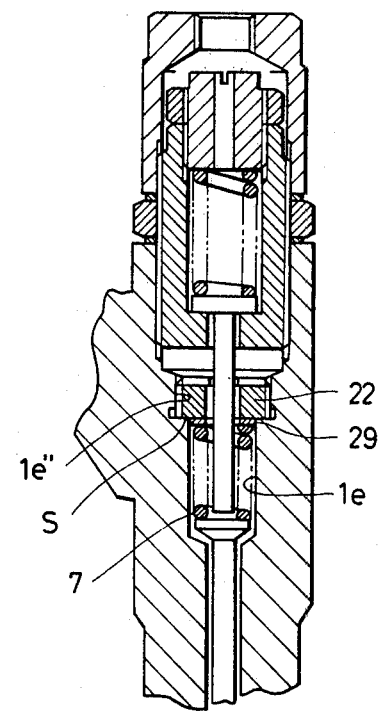
FIG. 10 is a longitudinal sectional view of the essential part of a fuel injection valve according to a sixth embodiment of the invention.

Referring to the embodiment illustrated in FIG. 10, this embodiment is distinguished from the embodiment of FIG. 4 in that the space 1e is formed with an annular offset S at its upper portion, which provides an enlarged threaded portion 1e'', to supersede the lock nut 24 shown in FIG. 4. Threadedly fitted in the enlarged threaded portion 1e'' is the retaining nut 22. The setting load of the first nozzle spring 7 can be adjusted by selecting the thickness of the shim 29 interposed between the first nozzle spring 7 and the nut 22.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A fuel injection valve comprising: an injection nozzle having a nozzle hole portion and a nozzle needle arranged to be seated on said nozzle hole portion; a nozzle holder supporting said injection nozzle; a first spring arranged within said nozzle holder; a first movable spring seat coupled to said nozzle needle and supporting said first spring; means for adjusting the setting load of said first spring; a lift adjusting threaded member threadedly engaging said nozzle holder and rotatable relative thereto for displacement axially thereof, said threaded member being arranged to be operated for rotation from outside; a second spring supportedly engaging said lift adjusting threaded member; a second movable spring set engaging said lift adjusting threaded member and supporting said second spring, said second movable spring seat having one end disposed in a facing relation to said first movable spring seat and adapted to have said one end spaced from the first movable spring seat by a predetermined gap when said nozzle needle is in a seated position; said second spring and said second movable spring seat being so disposed that said first and second springs have a combined force thereof acting upon said nozzle needle when said nozzle needle is lifted beyond said predetermined gap; axial displacement of said lift adjusting threaded member, which is caused by rotation thereof, causing corresponding axial displacement of said second movable spring seat through said second spring, thereby permitting adjustment of the position of said second movable spring seat relative to said first movable spring seat so as to set the gap between said first movable spring seat and said second movable spring seat at a value within a range of between zero and a value equal to said predetermined gap when said nozzle needle is in a seated position; and means arranged to be operated from outside for adjusting the setting load of said second spring; whereby lifting of said nozzle needle from a seated position thereof causes said first movable spring seat to be lifted against the force of said first spring through a lift of said nozzle needle determined by said predetermined gap to effect an initial injection, and thereafter causes said first movable spring seat to urge said second movable spring seat against the combined force of said first and second springs to lift said second movable spring seat to effect a main injection.

2. The fuel injection valve as claimed in claim 1, wherein said lift adjusting threaded member has an internal space formed therein and an end wall at an end of said internal space; and said second movable spring seat has a push rod and an enlarged spring seating portion formed integrally on an end of said push rod, said enlarged spring seating portion being disposed within said internal space of said lift adjusting threaded member and urged by said second spring against said end wall of said internal space facing toward said injection nozzle, said push rod having another or free end projected from said internal space through said end wall of said internal space, in a facing relation to said first movable spring seat.

3. The fuel injection valve as claimed in claim 2, wherein said internal space of said lift adjusting threaded member has an end face remote from said injection nozzle, and an end opening in said end face; and said means for adjusting the setting load of said second spring comprises a threaded member rotatably threadedly fitted in said open end of said lift adjusting threaded member in a manner urging said second spring.

4. The fuel injection valve as claimed in claim 1, wherein said lift adjusting threaded member has a recess which has a bottom wall and an open end facing toward said nozzle portion; and said second movable spring seat comprises a push rod having a free end disposed in a facing relation to said first movable spring seat, an enlarged spring seating portion provided on another end of said push rod, and an extension extending integrally from said another end of said push rod through said bottom wall of said recess, said extension having a free end projecting from said bottom wall of said recess in a direction away from said injection nozzle; said second spring being interposed between said bottom wall of said recess and second movable spring seat.

5. The fuel injection valve as claimed in claim 4, wherein said projected free end of said extension of said second movable sring seat is threaded; and said means for adjusting the setting load of said second spring comprises a threaded member rotatably threadedly fitted on said threaded projection free end of said extension of said second movable spring seat.

6. The fuel injection valve as claimed in claim 4, wherein said projected free end of said extension of said second movable spring seat has an enlarged portion for prohibiting displacement of said second movable spring seat toward said injection nozzle; and said means for adjusting the setting load of said second spring comprises a shim interposed between said enlarged spring seating portion of said second movable spring seat and an associated end of said second spring.

7. The fuel injection valve as claimed in any one of claims 4, 5 or 6, wherein said enlarged spring seating portion of said second movable spring seat comprises a snap ring fitted in an annular groove formed on said other end of said push rod, and a spring seat member fitted on said extension of said second movable spring seat and disposed in contact with said snap ring.

8. The fuel injection valve as claimed in any one of claims 1, 2 or 3, wherein said nozzle holder has an internal space and an end wall of said internal space; said first spring, said first movable spring seat and said means for adjusting the setting load of said second spring being located in said internal space; and said means for adjusting the setting load of said second spring comprises a shim interposed between one end of said first spring and an associated end wall of said internal space.

9. The fuel injection valve as claimed in any one of claims 1 through 6, wherein said nozzle holder has a first space opening in an end face thereof remote from said injection nozzle and in which said lift adjusting threaded member is threadedly fitted, and a second space formed adjacent said first space at a side thereof facing toward said injection nozzle and within which said first spring, said first movable spring seat and said means for adjusting the setting load of said first spring are located; and said means for adjusting the setting load of said first spring comprises a threaded member rotatably threadedly fitted in a portion of said second space closer to said first space and urging one end of said first spring.

10. The fuel injection valve as claimed in any one of claims 1, 2 or 3, including a retaining spring for retaining said lift adjusting threaded member in place; and wherein said nozzle holder has a first space in which said lift adjusting threaded member is rotatably threadedly fitted, and a second space formed adjacent said first space at a side thereof facing toward said injection nozzle, said retaining spring being arranged within said second space and permanently urging said lift adjusting threaded member in a direction away from said injection nozzle to maintain at an adjusted value said predetermined gap between said first movable spring seat and said second movable spring seat which determines the initial injection lift of said nozzle needle.

11. A fuel injection valve comprising: an injection nozzle having a nozzle hole portion and a nozzle needle arranged to be seated on said nozzle hole portion; a nozzle holder supporting said injection nozzle; a first spring arranged within said nozzle holder; a first movable spring seat coupled to said nozzle needle and supporting said first spring; said nozzle holder having an internal space within which said first spring and said first movable spring seat are located, and an end wall of said internal space; a shim arranged within said internal space and interposed between an end of said first spring and an associated end wall of said internal space, for adjusting the setting load of said first spring; a lift adjusting threaded member threadedly engaging said nozzle holder and rotatable relative thereto for displacement axially thereof, said threaded member arranged to be operated for rotation from outside; a second spring supportedly engaging said lift adjusting threaded member; a second movable spring seat engaging said lift adjusting threaded member and supporting said second spring, said second movable spring seat having one end disposed in a facing relation to said first movable spring seat and adapted to have said one end spaced from said first movable spring seat by a predetermined gap when said nozzle needle is in a seated position; said second spring and said second movable spring seat being so disposed that said first and second springs have a combined force thereof acting upon said nozzle needle after said nozzle needle is lifted beyond said predetermined gap; axial displacement of said lift adjusting threaded member, which is caused by rotation thereof, causing corresponding axial displacement of said second movable spring seat through said second spring, thereby permitting adjustment of the position of said second movable spring seat relative to said first movable spring seat so as to set the gap between said first movable spring seat and said second movable spring seat at a value within a range of between zero and a value equal to said predetermined gap when said nozzle needle is in a seated position; means arranged to be operated from outside for adjusting the setting load of said second spring; and a retaining spring for retaining said lift adjusting threaded member in place; said nozzle holder having a first space in which said lift adjusting threaded member is rotatably fitted, and a second space formed adjacent said first space at a side thereof facing toward said injection nozzle, said retaining spring being arranged within said second space and permanently urging said lift adjusting threaded member in a direction away from said injection nozzle to retain said predetermined gap between said first movable spring seat and said second movable spring seat at an adjusted value; whereby lifting of said nozzle needle from a seated position thereof causes said first movable spring seat to be lifted against the force of said first spring through a lift of said nozzle needle determined by said predetermined gap to effect an initial injection, and thereafter causes said first movable spring seat to urge said second movable spring seat against the combined force of said first and second springs to lift said second movable spring seat to effect a main injection.

12. The fuel injection valve as claimed in claim 11, wherein said lift adjusting threaded member has a further internal space formed therein, and an end wall of said further internal space; said second movable spring seat has a push rod and an enlarged spring seating portion formed integrally on an end of said push rod, said enlarged spring seating portion being disposed within said further internal space of said lift adjusting threaded member and urged by said second spring against said end wall of said further internal space facing toward said injection nozzle, said push rod having another or free end projected from said further internal space through said end wall of said further internal space, in a facing relation to said first movable spring seat.

* * * * *